United States Patent [19]

Kitchener

[11] Patent Number: 4,650,975
[45] Date of Patent: Mar. 17, 1987

[54] IC CARD AND AN IDENTIFICATION SYSTEM THEREOF

[75] Inventor: Robert A. Kitchener, Armonk, N.Y.

[73] Assignee: Casio Computer Co., Ltd., Tokyo, Japan

[21] Appl. No.: 645,925

[22] Filed: Aug. 30, 1984

[51] Int. Cl.⁴ ............................................. G06F 15/20
[52] U.S. Cl. .................................... 235/375; 235/380; 235/492
[58] Field of Search ......................... 235/492, 380, 375

[56] References Cited

U.S. PATENT DOCUMENTS

| | | |
|---|---|---|
| 3,906,460 | 9/1975 | Halpern . |
| 3,934,122 | 1/1976 | Riccitelli . |
| 3,971,916 | 7/1976 | Moreno . |
| 4,007,355 | 2/1977 | Moreno . |
| 4,092,524 | 5/1978 | Moreno . |
| 4,102,493 | 7/1978 | Moreno . |
| 4,105,156 | 8/1978 | Dethloff . |
| 4,211,919 | 7/1980 | Ugon . |
| 4,216,577 | 8/1980 | Badet et al. . |
| 4,222,516 | 9/1980 | Badet et al. . |
| 4,382,279 | 5/1983 | Ugon . |
| 4,405,829 | 9/1983 | Rivest et al. . |
| 4,542,465 | 9/1985 | Stockburger et al. ......... 340/825.34 |
| 4,544,832 | 10/1985 | Young et al. .................... 235/380 X |

FOREIGN PATENT DOCUMENTS 53-6491 3/1978 Japan .

Primary Examiner—David L. Trafton
Attorney, Agent, or Firm—Frishauf, Holtz, Goodman & Woodward

[57] ABSTRACT

A plurality of secret data for identifying IC cards is stored in a memory which is provided in an IC circuit incorporated in the IC card. When an IC card is supplied to an issuer from a manufacturer, a sealed sheet on which a production master key (PMK) data is printed is separately sent to the issuer from the manufacturer. The PMK data printed on the sealed sheet is supplied to the IC card to be compared with a PMK data stored therein. The entrance of a primary account number (PAN) data to the IC card is allowed only when a coincidence signal is obtained. An initialization personal identification number (IPIN) data is printed on a sealed sheet which is separately sent to a card holder from the issuer. At the card holder's stage, the IPIN data and an IPIN data stored in the IC card are compared with each other. The registration of the personal identification number to the IC card may be performed only when a coincidence signal is obtained.

51 Claims, 13 Drawing Figures

| PUBLIC | 1 | ISSUER CODE |
|---|---|---|
| PUBLIC | 2 | " |
| PUBLIC | 3 | " |
| | | |
| PUBLIC | 20 | ISSUER CODE |

IC CARD AND AN IDENTIFICATION SYSTEM THEREOF

BACKGROUND OF THE INVENTION

The present invention relates to an IC card incorporating an IC circuit in a card, and an IC card identification system for identifying various IC card states wherein the IC card is supplied to a card holder or a customer through an issuer such as a manufacturer or a bank and the card holder goes shopping in a store.

A conventional magnetic card has a magnetic coating which is formed on the surface thereof and on which a key code or a confidential number, an account number and so on are magnetically recorded. The magnetic contents such as the key code are known to at least bank personnel since the holder as a user must submit his key code to the bank. In addition, a magnetic record can be relatively easily accessed. Because of this, the private key code of the magnetic card cannot be kept secret.

In place of such a magnetic card, an IC card incorporating an IC has been recently proposed that disables easy reading of recorded contents. However, there are many opportunities for unfair practice on such an IC card. It is very difficult to prevent such unfair practice in a construction of a conventional IC card and its identification system.

SUMMARY OF THE INVENTION

It is an object of the present invention to prevent theft or forgery of an IC card during dispatch of an IC card from a manufacturer to an IC card issuer and from the issuer to the holder, to provide an IC card which cannot be subject to unfair practice when it is used, and an IC card identification system.

According to an aspect of the present invention, there is provided an IC card comprising an IC circuit which includes:

first memory means for storing a plurality of secret data;

second memory means for storing production master key (PMK) data preset by a manufacturer and used for checking validity of an issuer, and initialization personal identification number (IPIN) data used for checking validity of a card holder;

third memory means for storing personal identification number (PIN) data preset by the card holder and used for checking validity of the holder;

interface means for controlling input/output data with respect to the IC card;

comprising means for comparing external data supplied through said interface means with the data stored in said second or third memory means;

inhibiting means for inhibiting an access of said first memory means in accordance with a noncoincidence signal from said comparing means; and permitting means for permitting the access of said first memory means in response to a coincidence signal from said comparing means.

According to another aspect of this invention, there is provided:

an IC card incorporating an IC circuit including a memory for storing a plurality of secret data preset by a manufacturer, the plurality of secret data including at least production master key (PMK) data and initialization personal identification number (IPIN) data;

printout means for printing out the PMK data by the manufacturer in a strictly secret state on a first sealed sheet, the PMK data being stored in said IC card;

means for separately delivering said IC card and the first sealed sheet to an issuer;

means for identifying the PMK data obtained by entering the PMK data printed on said first sealed sheet with the PMK data stored in said memory of said IC card;

means for storing primary account number (PAN) data in said IC card upon detection of a coincidence between the entered PMK data and the PMK data stored in said memory and for printing out the IPIN data read out from said memory on a second sealed sheet;

means for separately delivering said IC card and said second sheet to a card holder;

means for identifying IPIN data entered by the IPIN data printed on said second sealed sheet with the IPIN data stored in said memory of said IC card; and means for storing personal identification number (PIN) data which is arbitrarily selected by the card holder in the IC circuit upon detection of a coincidence between the entered IPIN data and the IPIN data stored in said memory.

According to further aspect of this invention, there is provided:

an IC card incorporating an IC circuit including a memory for storing card authentication (CA) data preset by a manufacturer and given such that different CA data are assigned in units of IC cards;

a host computer for reading out the different CA data from the respective IC cards and storing all the CA data in a data base; and a terminal, connected to said host computer through a public circuit, for identifying a presented IC card, said terminal having readout means for reading out the CA data from the presented IC card, means for encrypting predetermined transaction message data in accordance with the CA data from the presented IC card, and means for transmitting encrypted predetermined transaction message data to said host computer, and said host computer having means for decrypting the encrypted transaction message data by using the CA data stored in the data base, means for discriminating whether or not the decrypted transaction message data is the predetermined transaction message data in said terminal, and means for transmitting a discriminated result to said terminal.

According to still further aspect of this invention, there is provided:

an IC card incorporating an IC circuit including a memory for storing issuer's private key (PRK) data preset by a manufacturer in a secret manner; and a terminal for storing issuer's public key data preset by the manufacturer in a secret manner and for identifying an IC card presented by a card holder, the issuer's public key data being different from the PRK data but having a correlation with the PRK data in a one-to-one correspondence in accordance with a predetermined function known by only the manufacturer, and said terminal having means for encrypting predetermined test message data in accordance with the public key data and means for transmitting encrypted test message data to said IC card, said IC card having means for receiving the encrypted test message data and decrypting the message data by the private key data stored therein and means for transmitting decrypted test message data to said terminal, and said terminal further including means for comparing the decrypted test message data from said IC card with a predetermined self test message, and means for producing an alarm of a comparison result.

DETAILED DESCRIPTION OF THE PREFERRED EMBODIMENT

Figure 1:
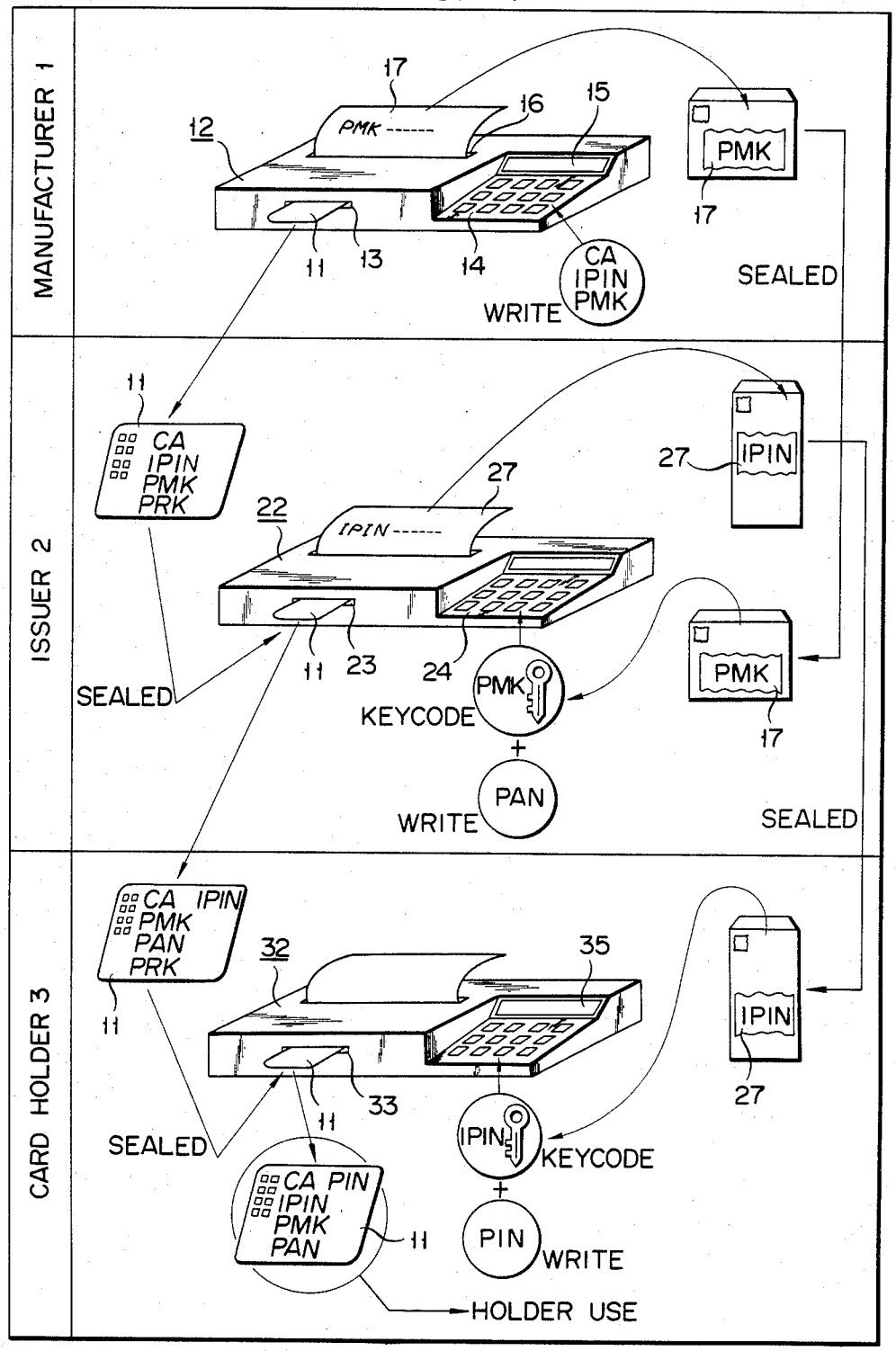
FIG. 1 shows card identification steps for an IC card to be supplied from a manufacturer to a holder through an issuer.

A preferred embodiment of the present invention will be described with reference to the accompanying drawings. The overall system will be described with reference to FIG. 1. FIG. 1 shows the relationship between a manufacturer 1 for manufacturing an IC card, an issuer 2 such as a bank for issuing an IC card, and a card holder 3 who uses the IC card. The manufacturer 1 manufactures an IC card 11 which will be described in detail later. The manufacturer 1 manufactures the IC card 11 and writes a predetermined code on the IC card 11 using an IC card issuing machine 12. The IC card 11 incorporates an IC circuit to be described in detail later. A connector 11a is arranged on the upper surface of the IC card 11. When the IC card 11 is mounted in the IC card issuing machine 12, the IC card 11 is connected to an internal circuit of the IC card issuing machine 12 through the connector 11a. The IC card issuing machine 12 has a card insertion port 13, a keyboard 14, a display panel 15 and a printer 16. Various codes such as "CA", "IPIN", "PMK" are selectively written on the IC card 11 in accordance with input data entered by an operator at the keyboard 14. The code "CA" (Card Authenticator) comprises a random 64-bit code which can be used as the key for encryption/decryption. The code "IPIN" (Initialization Personal Identification Number) comprises a random 6-bit code which is used until a personal identification number (PIN) is used. The code "PMK" (Production Master Key Code) represents a random code assigned to each manufactured group. The code "PMK" is kept secret even within the manufacturing plant. The code "PMK" (Private Key Code) comprises a decryption code which has a relationship in one-to-one correspondence with the encryption code "Public Key Code" assigned to a POS terminal (to be described later). When a predetermined code is written by the IC card issuing machine 12 on the IC card 11, only the code "PMK" is printed by the printer 16 on a printing paper sheet 17. The manufacturer 1 separately seals the IC card 11 recorded with the predetermined code and the paper sheet 17 printed with the code "PMK". The IC card 11 and the paper sheet 17 are sent to the issuer 2. The issuer 2 loads the IC card 11 in an IC issuing machine 22 and reads the content of the code "PMK" on the paper sheet 17 sent from the manufacturer 1 and enters the content in the IC card issuing machine 22. Furthermore, the issuer 2 enters a code number "PAN" (Primary Account Number) for the IC card 11 in the IC card issuing machine 22. The code number is constituted by numerals. This may also be constituted by alpha-numeric characters. The IC card issuing machine 22 comprises a card insertion port 23, a keyboard 24, a display panel 25 and a printer 26 in the same manner as the IC issuing machine 12. When the IC card is entered to the IC card issuing machine 22, the code "PMK" written in the IC card 11 is compared with input data "PMK" entered at the keyboard 24 in the IC card. Only when a coincidence between the code "PMK" written in the IC card 11 and the input data "PMK" is established, is the account number "PAN" written in the IC card 11. The code "IPIN" is read out from the IC card 11 and is printed on a printing paper sheet 27. The IC card 11 written with the account number "PAN" and the paper sheet 27 printed with the "IPIN" are separately sealed and are sent to the card holder 3. When the card holder 3 receives the IC card 11 and the paper sheet 27 from the issuer 2, the card holder 3 goes to a card holder IC card issuing machine 32 which is installed on the issuer's premises. The card holder 3 then loads the IC card 11 into the IC card issuing machine 32, and the content of the code "IPIN" printed on the paper sheet 27 sent from the issuer 2 is read and entered in the IC card issuing machine 32. The card holder 3 enters any personal identification number "PIN". The IC card issuing machine 32 comprises a card insertion port 33, a keyboard 34, a display panel 35 and a printer 36 in the same manner as in the IC card issuing machine 22. When the IC card is put into the IC card issuing machine 32 the code "IPIN" stored in the IC card 11 is compared with the input data "IPIN" entered at the keyboard 24 in the IC card. Only when a coincidence is established, is the personal identification number "PIN" written in the IC card 11. In this manner, the IC card issuing procedures are completed, and this IC card is then ready for use.

Figure 2:
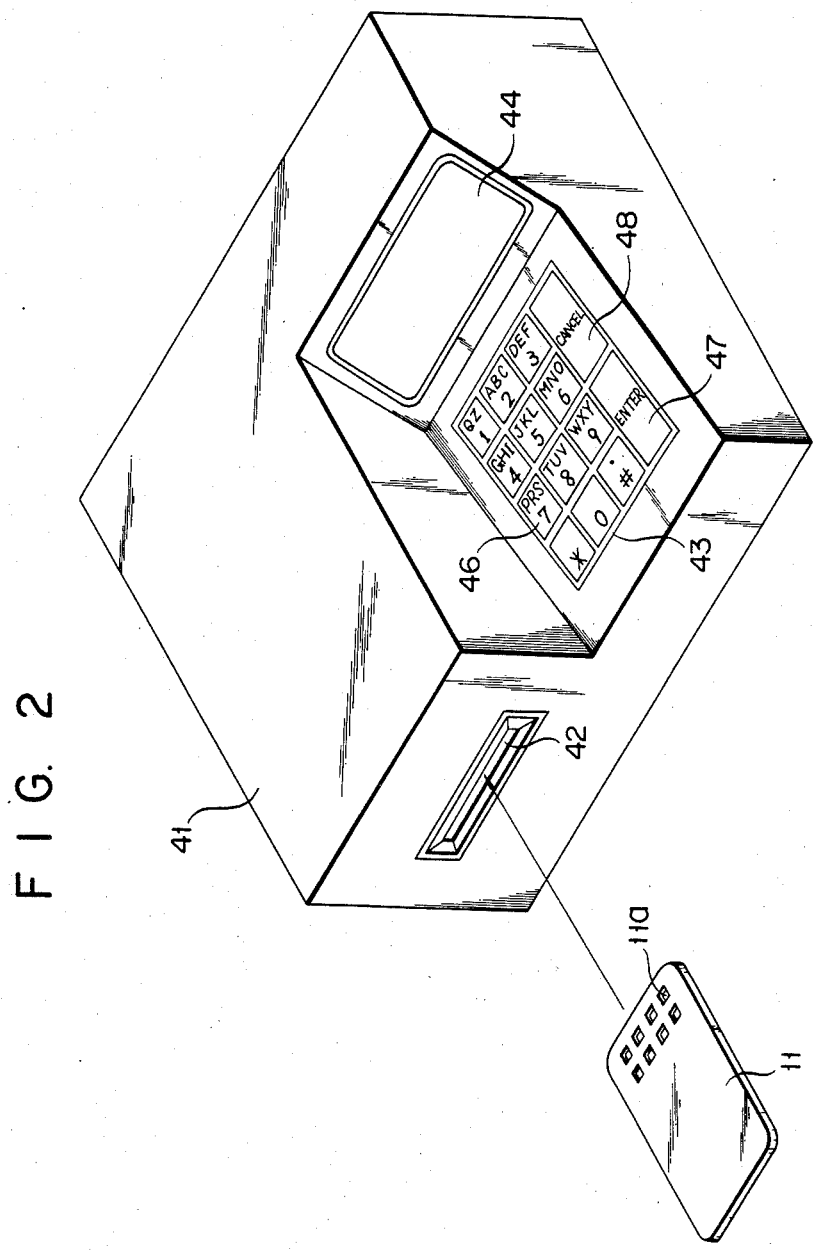
FIG. 2 is a perspective view showing an outer appearance of a POS (point of sales) terminal.

FIG. 2 shows the outer appearance of a POS terminal 41 in which the IC card 11 is used. The POS terminal 41 comprises a card insertion port 42, a keyboard 43, a display panel 44 and the like. The keyboard 43 has numeric keys 46, an enter key 47 and a cancel key 48. The internal circuit of the POS terminal 41 will be described in detail later.

Figure 3:
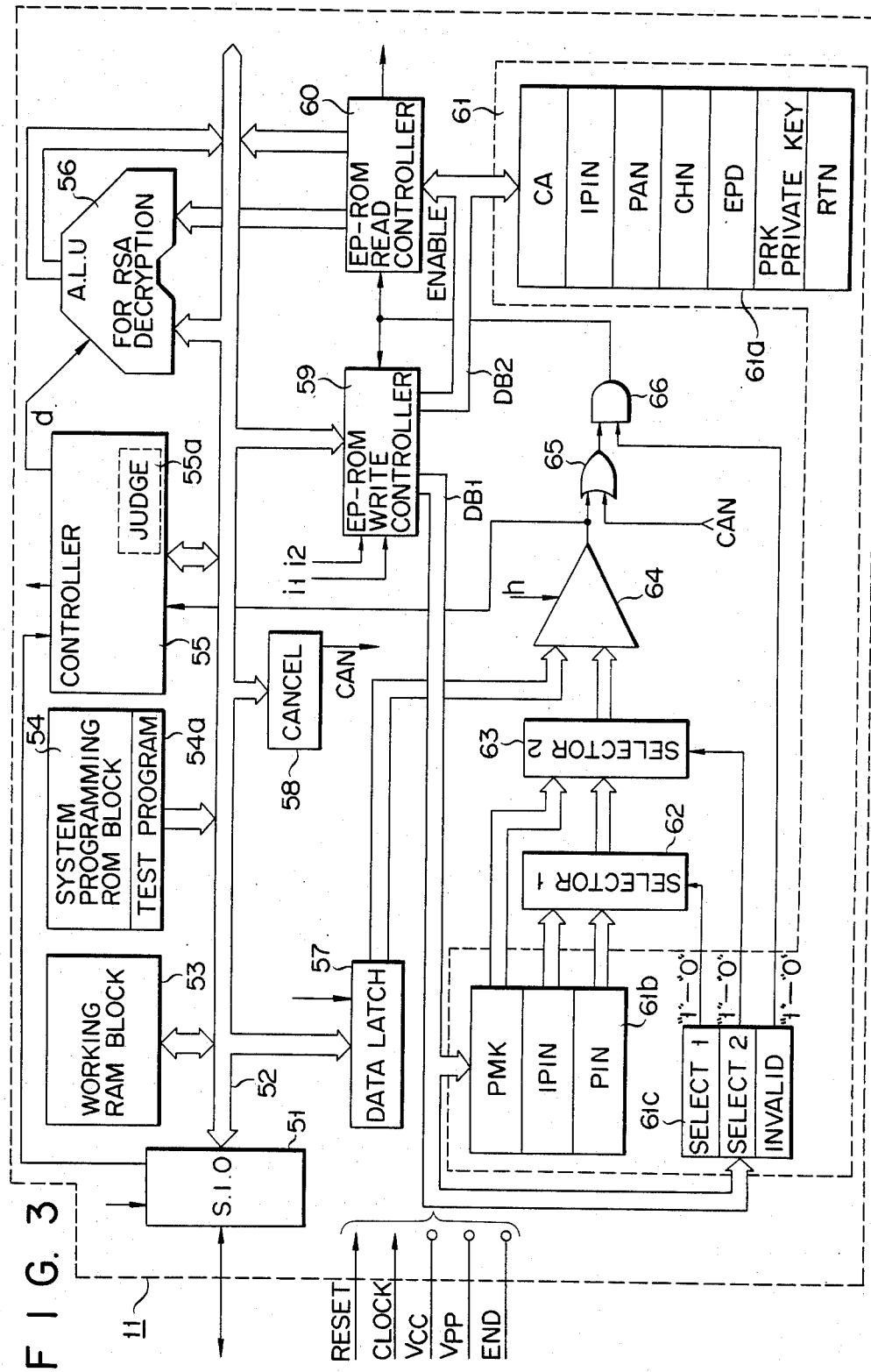
FIG. 3 is a block diagram of an IC circuit incorporated in an IC card.

An IC circuit incorporated in the IC card 11 will be described in detail with reference to FIG. 3. Referring to FIG. 3, a serial interface 51 is arranged between the connector 11a and an internal system bus 52. When the IC card 11 is loaded in the POS terminal 41, the IC card 11 receives a reset signal RESET and a system clock CLOCK from the POS terminal 41 through the connector 11a, and is connected to a Vcc power supply, a Vpp power supply and a ground line GND. The Vcc power supply serves as a system drive power supply and is set at a voltage of +5 V. The Vpp power supply serves as a data write power supply for an EP-ROM (Erasable-Programmable ROM) 61 (to be described later) and is set at a voltage of +25 V. A working RAM block 53, a system programming ROM block 54, a system controller 55, an ALU 56 for RSA decryption, a data latch 57, a cancel latch 58, an EP-ROM write controller 59, and an EP-ROM read controller 60 are connected to the system bus 52. The programming ROM block 54 stores various types of system programs and a test program 54a for testing the function of the IC card 11. The system controller 55 has a judgment area 55a therein. The system controller 55 supplies operation instructions a to i to respective circuits in response to a data reception signal from the interface 51 and in accordance with the operating conditions of the respective circuits. The EP-ROM write controller 59 controls the write operation of the EP-ROM 61 in accordance with an instruction from the system controller 55. The EP-ROM 61 is a memory to which data can be written only once and which comprises a programmable memory which has three memory areas 61a, 61b and 61c. The memory area 61a stores the codes "CA", "IPIN", "PAN", "CHN", "EPD", "PRK" and "RTN". The memory area 61b stores the codes "PMK", "IPIN" and "PIN". The memory area 61c has flags of "Select 1", "Select 2" and "Invalid". The code "CHN" stored in the memory area 61a represents a "card holder's name". The code "EPD" represents an "Expiration Date". The code "RTN" represents the number of reentry operations when wrong data is entered. A plurality of memory area portions are provided for the code "RTN" to reenter the data a plurality of times. The "Select 1", "Select 2" and "Invalid" flags stored in the memory area 61c are initially set at logic "1". When a control signal i1 is supplied from the system controller 55 to the EP-ROM write controller 59, the EP-ROM write controller 59 sends out data onto a data bus DB1 for the memory areas 61b and 61c. However, when a control signal i2 is supplied from the system controller 55 to the EP-ROM write controller 59, the controller 59 sends out data onto a data bus DB2 for the memory area 61a. The codes "IPIN" and "PIN" stored in the memory area 61b are selected by a first selector 62 and are supplied to a second selector 63. The code "PMK" stored in the memory area 61b is read out and supplied to the second selector 63. The first and second selectors 62 and 63 are selectively operated in accordance with the logical states of the flags "Select 1" and "Select 2". More particularly, when the "Select 1" flag is set at logic "1", the first selector 62 selects the code "IPIN". However, when the "Select 1" flag goes to logic "0", the first selector 62 selects the code "PIN". Similarly, when the "Select 2" flag is set at logic "1", the second selector 63 selects the code "PMK"; but when the "Select 2" flag goes to logic "0", the second selector 63 selects the output from the first selector 62. An output from the second selector 63 together with data held by the data latch 57 is supplied to a comparator 64. The comparator 64 compares the output from the second selector 63 and the data from the data latch 57 in response to the control signal h from the system controller 55. A comparison result is supplied to an OR gate 65 and the system controller 55. The OR gate 65 also receives cancel data Can from the cancel latch 58. An output from the OR gate 65 is supplied to an AND gate 66. The OR gate 65 is controlled in accordance with the logical state of the "Invalid" flag held in the memory area 61c. The output from the OR gate 65 is supplied as an enable signal to the EP-ROM write controller 59 and the EP-ROM read controller 60. The EP-ROM read controller 60 reads out data from the memory area 61a in the EP-ROM 61 in response to the instruction from the system controller 55. The readout data is supplied to the system bus 52 or the ALU 56. The ALU 56 is provided for performing the decryption based on "RSA" algorithm and decrypts the input data in response to the instruction d from the system controller 55, and the decrypted data is sent onto the system bus 52.

Figure 4:
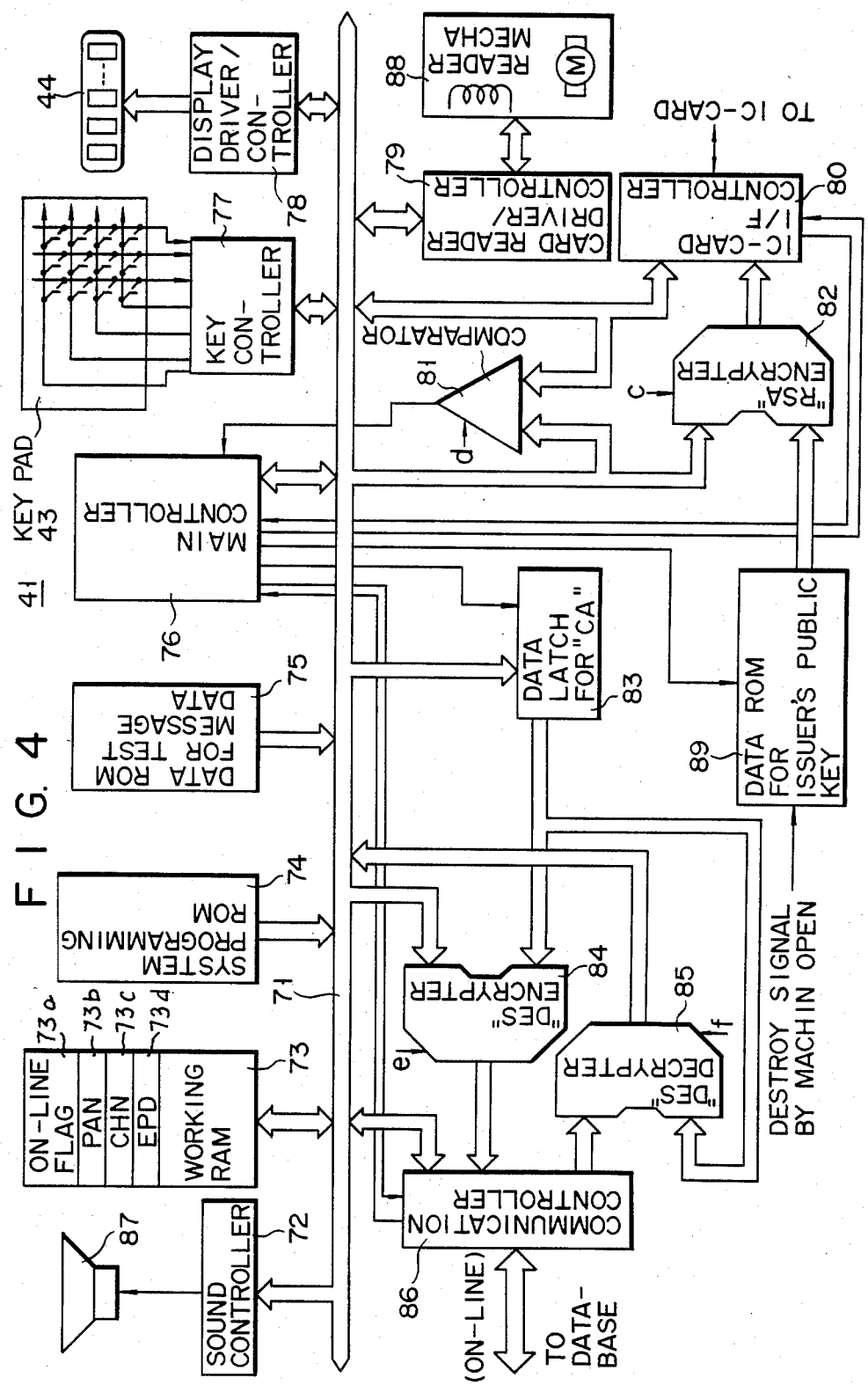
FIG. 4 is a block diagram of the POS terminal shown in FIG. 2.

The circuit arrangement of the POS terminal 41 will be described with reference to FIG. 4. Referring to FIG. 4, reference numeral 71 denotes a system bus. A sound controller 72, a working RAM 73, a system programming ROM 74, a data ROM 75 for storing test messages, a main controller 76, a key controller 77, a display driver/controller 78, a card reader driver/controller 79, an IC card interface 80, a comparator 81, an "RSA" encrypter 82, a latch 83 for latching the code "CA", a "DES" encrypter 84, a "DES" decrypter 85, and a communication controller 86 are connected to the system bus 71. The encrypter 82 is the "RSA" type for performing encryption based on the "RSA" algorithm. The encrypter 84 encrypts data based on "Data Encryption Standard". A loudspeaker 87 is connected to the sound controller 72 so as to generate an alarm sound as needed. The working RAM 73 has memory areas 73a, 73b, 73c and 73d which respectively store an "on-line flag", a "PAN", a "CHN" and an "EPD". The main controller 76 is connected to the IC card interface 80, the comparator 81, the communication controller 86 and the like and supplies control instructions to the respective circuits in accordance with the operating state of the system. The key controller 77 supplies a key sampling signal to the keyboard 43 to detect a key input signal. The display driver 78 performs display control on the display panel 44. The card reader driver/controller 79 controls a card reader mechanism 88. The card reader mechanism 88 has a card feed motor 88M to feed to a predetermined position the IC card 11 inserted from the card insertion port 42. The card reader mechanism 88 also causes the processed IC card 11 to return to the card insertion port 42. The IC card interface 80 controls data exchange between the POS terminal 41 and the IC card 11 in response to an instruction from the main controller 76. The interface 80 transmits data from the IC card 11 to the system bus 71 and the comparator 81. The interface 80 also transmits encrypted data from the encrypter 82 to the IC card 11. The encrypter 82 receives the data supplied from the data ROM 75 through the system bus 71 and encrypts the data in accordance with the public key code supplied from a public key code memory 89 consisting of a data ROM for the issuer.

The public key code is a code in one-to-one correspondence with "PRK" stored in the IC card at the issuer 2 and is provided for the encryption based on the RSA-algorithm. While, the "PRK" is a code for the decryption based on the RSA-algorithm. The public key code and the "PRK" are key codes selected to have a one-to-one relation by predetermined one-way functions based on the RSA-algorithm. According to this encryption method based on the RSA-algorithm, data encrypted by the public key data can hardly be decrypted by the same public key code. It is only possible to decrypt by the "PRK" having the relation provided by the one-way functions. This encryption method based on the RSA-algorithm is described in detail in the "CRYPTOGRAPHY" by Carl H. Meyer and Stephen M. Matyas, published in 1982, by John Wiley & Sons, Inc.

Figures 12, 13:
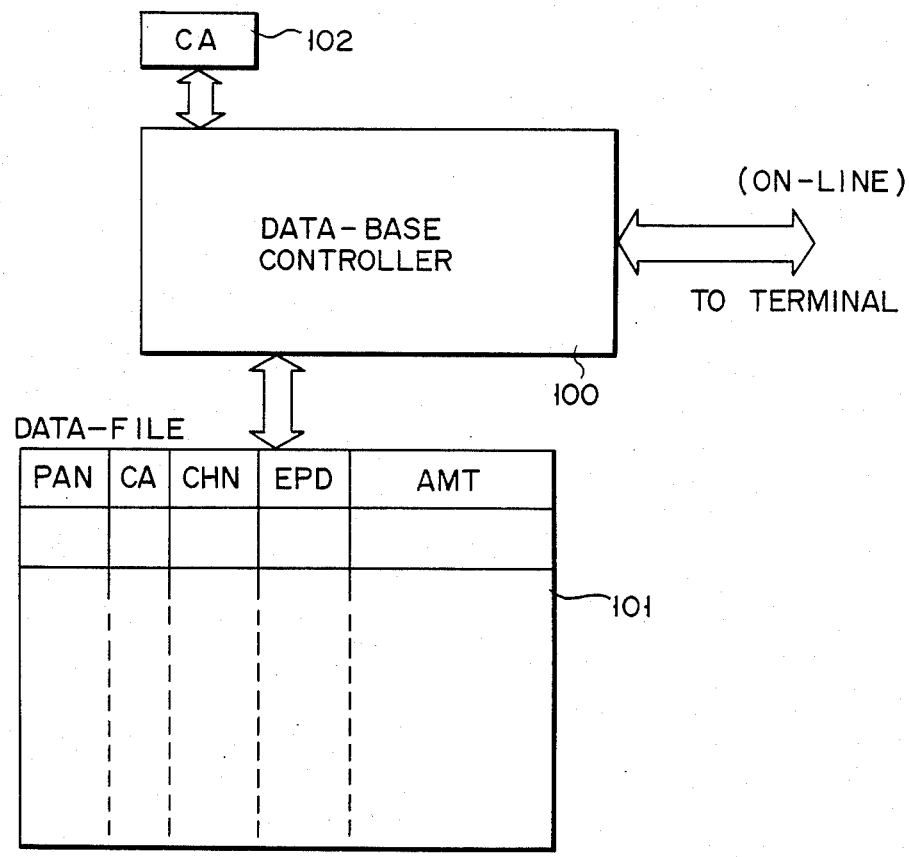
FIG. 12 shows a ROM table for storing data representing correspondence between a public key code stored in the POS terminal and the issuer code.
FIG. 13 is a representation schematically showing a data base configuration at the host computer.

In a public key code memory 89 in the POS terminal 41, public key codes whose number corresponds to the number of issuers or the sorts of "PRK" may be stored. Assuming now that IC cards manufactured by a manufacturer 1 are distributed to twenty issuers 2, twenty "PRK" codes are determined at the issuer 2. Public key codes corresponding to the "PRK" codes are communicated to a manufacturer of the terminal. The terminal and the manufacturer set the twenty public key codes communicated from twenty issuers to the public key memory 89 of the terminal 41. The data ROM in the public key code memory 89 has an internal configuration as shown in FIG. 12. One of public key codes such as "public 1", "public 2", . . . "public 20" can be determined by an issuer code included in the "PAN" code capable of reading from the IC card 11.

In the public key code memory 89 are preset public key codes corresponding to the "PRK" in the IC card 11. The public key code memory 89 generates a storage code when it receives an instruction from the main controller 76. When a destructive signal is supplied to the memory 89, the storage content is automatically destroyed. The destructive signal is supplied from the main controller 76 to the memory 89 when the access of the memory 89 by, for example, the POS terminal 41 is invalid. The public key code corresponding to the respective issuers stored in the public key code memory 89 cannot be externally read out. The code "CA" latched by the latch 83 is supplied to the "DES" encrypter and decrypter 84 and 85. The "DES" encrypter 84 receives predetermined data through the system bus and performs encryption processing in response to an instruction from the main controller 76. The encrypted code is then supplied to the communication controller 86. When the communication controller 86 is on-line connected with a data base, i.e., the host computer, the controller 86 sends the encrypted base to the host computer. The communication controller 86 also sends out onto the system bus 71 data which is supplied from the host computer and which is decrypted by the "DES" decrypter 85.

Figure 5:
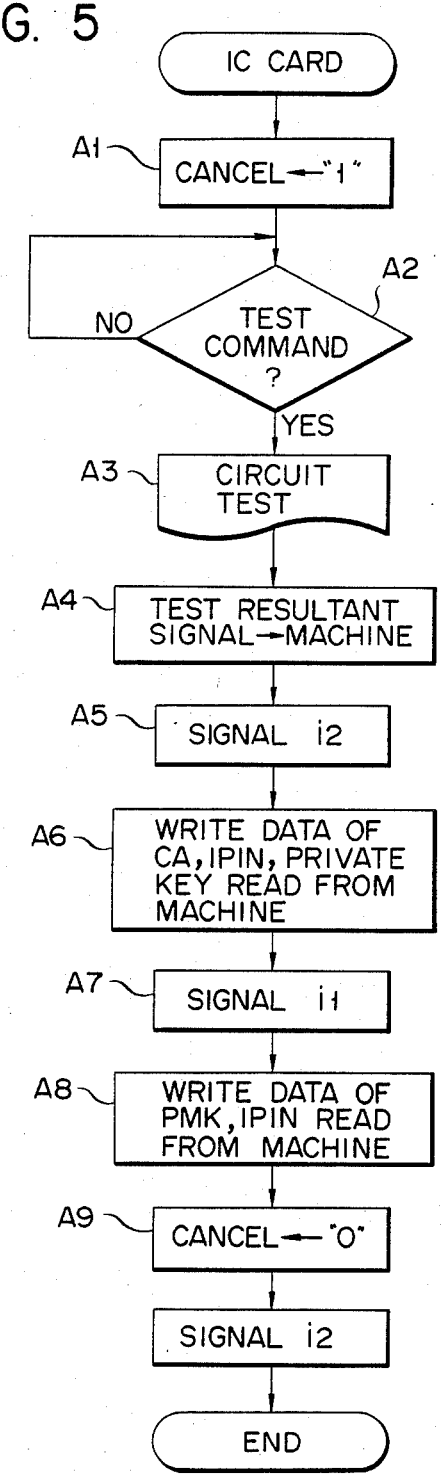
FIG. 5 is a flow chart for explaining an operation performed in the IC card manufactured by the manufacturer before the IC card is sent to an issuer.

The operation of the circuit shown in FIG. 4 will be described with reference to flow charts. First, the operation for issuing the IC card 11 from the manufacturer 1 to the issuer 2 will be described. As shown in FIG. 1, the manufacturer 1 loads the IC card 11 in the IC card issuing machine 12. The manufacturer 1 enters a start instruction and a circuit test instruction at the keyboard 14. When the start instruction is supplied to the IC card 11 from the IC card issuing machine 12, the operation is started, as shown in FIG. 5. In step A1 shown in FIG. 5, a signal of logic "1" is written in the cancel latch 58 shown in FIG. 3. The cancel signal Can ("1") latched by the cancel latch 58 is supplied to the AND gate 66 through the OR gate 65. The output from the comparator 64 is cancelled in response to the cancel signal Can. The "Invalid" flag in the memory area 61c in the EP-ROM 61 is set at logic "1", so that an output signal from the OR circuit 65 goes to logic "1" and an enable signal is supplied to the EP-ROM write controller 59 and the EP-ROM read controller 60. In step A2 in FIG. 5, the system controller 55 checks whether or not the test command is entered. If YES in step A1, the flow advances to step A3. In step A3, the circuit test operation is started. More particularly, the test program 54a is read out from the programming ROM block 54, and the circuit test is performed. When the circuit test is completed, the test result is supplied to the IC card issuing machine 12 in step A4. The test result is displayed on the display panel 15 so as to signal the result to the operator. A control signal i2 is supplied from the system controller 55 to the EP-ROM write controller 59 in step A5. When the EP-ROM write controller 59 receives the control signal i2, the controller 59 selects the data bus DB2. On the other hand, when the test result is displayed on the display panel 15 and the operator does not notice any failure, the operator enters codes "CA", "IPIN", at the keyboard 14 in step A6. In this case, the EP-ROM write controller 59 selects the data bus DB2 as described above, and the data entered at the keyboard 14 is written in the memory area 61a. In this case, other storage contents in the memory area 61a are held at logic "0". When data writing is completed, the flow advances to step A7, and the system controller 55 supplies the control signal i1 from the system controller 55 to the EP-ROM write controller 59. As a result, the EP-ROM write controller 59 selects the data bus DB1. In this state, the operator enters the codes "PMK" and "IPIN" at the keyboard 14 in step A8. Since the EP-ROM write controller 59 has selected the data bus DB1, the input data is written in the memory area 61b in the EP-ROM 61. The code "PMK" entered at the keyboard 14 is supplied to the printer 16 and is printed on the paper sheet 17. Thereafter, in step A9, data of logic "0" is written in the cancel latch 58, thereby completing the issuing operation of the IC card 11 by the manufacturer 1. The manufacturer 1 separately seals the IC card 11 having the predetermined code and the paper sheet 17 printed with the code "PMK". The IC card 11 and the paper sheet 17 are then separately sent to the issuer 2.

Figure 6:
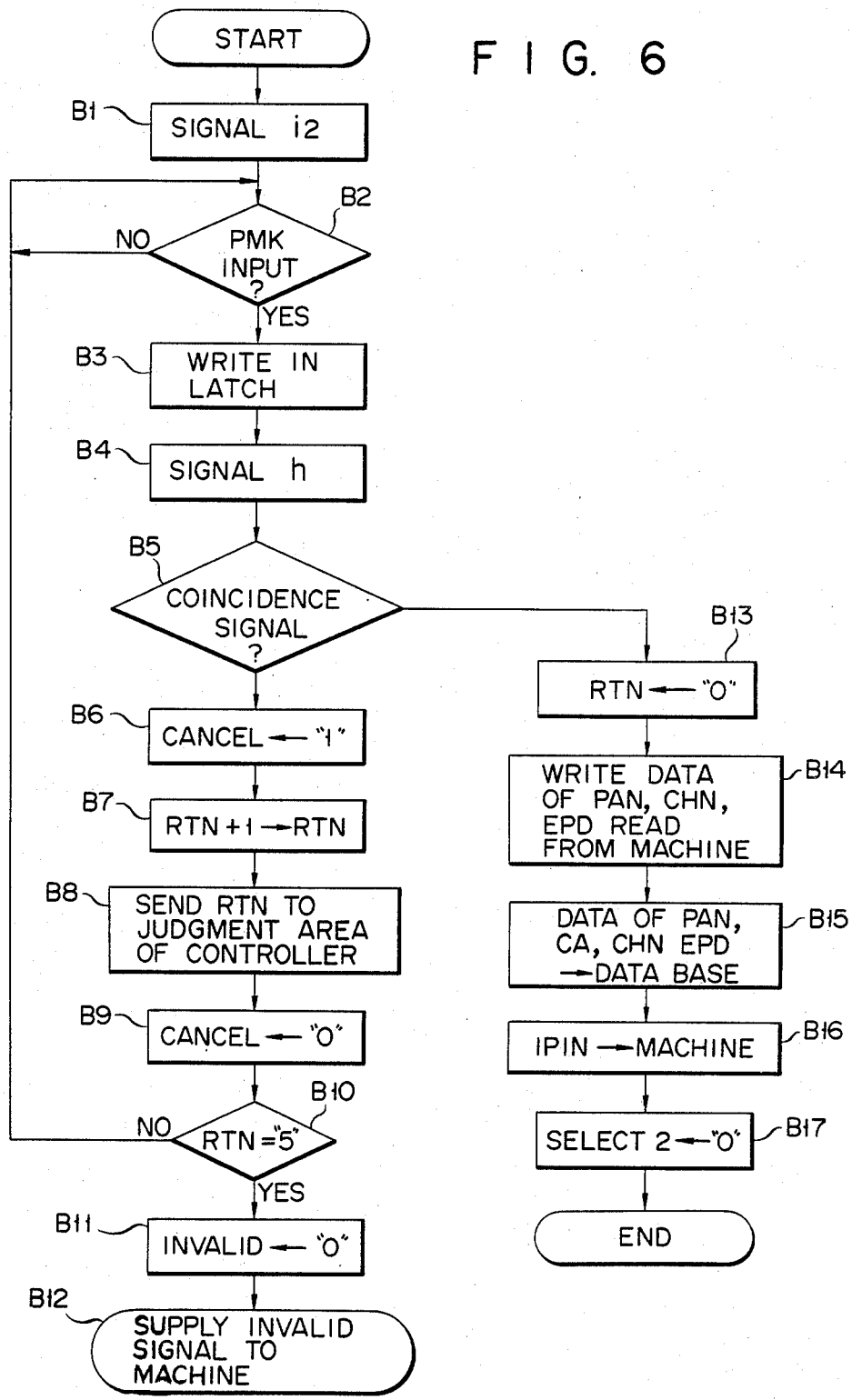
FIG. 6 is a flow chart for explaining an operation performed in the IC card before the IC card is issued from the issuer to the holder.

When the issuer 2 receives the IC card 11 and the paper sheet 17 with the code "PMK" from the manufacturer 1, the issuer 2 loads the IC card 11 in the IC card issuing machine 22, as shown in FIG. 1. The code "PMK" is then entered at the keyboard 24. When the IC card 11 having the arrangement described in detail with reference to FIG. 3 is loaded in the IC card issuing machine 22, the operation is performed in accordance with the flow chart shown in FIG. 6. In step B1, the control signal i2 is supplied from the system controller 55 to the EP-ROM write controller 59. The EP-ROM write controller 59 selects the data bus DB2. In step B2, the system controller 55 checks whether or not the data is entered at the keyboard 24. When the data is entered at the keyboard 24, the interface 51 supplies a data reception signal to the system controller 55. The system controller 55 checks whether or not the data is entered at the keyboard 24 in accordance with the presence/absence of the data reception signal. If YES in step B2, the system controller 55 supplies a latch instruction to the data latch 57. In step B3, the input data from the keyboard 24 is latched in the data latch 57. When the system controller 55 causes the data latch 57 to latch the key input data, the system controller 55 supplies the control signal h to the comparator 64 in step B4. The comparator 64 compares the data latched by the data latch 57 with the code "PMK" stored in the memory area 61a in the EP-ROM 61 in step B5. Since the "Select 2" flag in the memory area 61c in the EP-ROM 61 is set at logic "1", the second selector 63 selects the code "PMK" held in the memory area 61b. The selected code "PMK" is supplied to the comparator 64. For this reason, when the comparator 64 receives the operation instruction from the controller 55, the comparator 64 compares the code "PMK" selected by the second selector 63 with the key input data latched by the data latch 57. The comparison result of the comparator 64 is supplied to the system controller 55. When a coincidence signal is not generated from the comparator 64, the system controller 55 writes data of logic "1" in the cancel latch 58 in step B6 so as to generate the cancel signal Can. As a result, an output signal from the OR gate 65 is set at logic "1", and this output is supplied to the AND gate 66. In this case, the flag "Invalid" in the memory area 61c is set at logic "1", so that an output from the AND gate 66 is set at logic "1". As a result, an enable signal is supplied to the EP-ROM write controller 59 and the EP-ROM read controller 60. The system controller 55 supplies the control instruction to the EP-ROM write controller 59. In step B7, the count of the code "RTN" stored in the memory area 61a in the EP-ROM 61 is incremented by one. Subsequently, the system controller 55 causes the EP-ROM read controller 60 to transfer the code "RTN" from the memory area 61a to the judgment area 55a. In step B9, the cancel latch 58 is reset. In step B10, the system controller 55 checks whether or not the count of the code "RTN" in the judgment area 55a has reached 5. If NO in step B10, the flow returns to step B2, and the above operation is repeated. Even if the above operation is repeated, and the coincidence signal is not generated but the count of the code "RTN" has reached 5, the judgment result in step B10 becomes YES. The flow advances to step B11, and the flag "Invalid" in the memory area 61c is reset to logic "0". In step B12, the invalid signal is supplied to the IC card issuing machine 22 so as to signal to the operator that the IC card 11 has become invalid. The above operation is performed to confirm that the issuer 2 knows the proper code "PMK", i.e., to check the validity of the issuer 2.

When the proper code "PMK" is entered at the keyboad 24, the comparator 64 generates the coincidence signal which is then supplied to the system controller 55 and to the AND gate 66 through the OR gate 65. As a result, the judgment result in step B5 becomes YES, and the flow advances to step B13. In step B13, the count of the code "RTN" stored in the memory area 61a in the EP-ROM 61 is reset to zero. In other words, when the coincidence output from the comparator 64 is supplied to the AND gate 66 through the OR gate 65, data of the flag "Invalid" ("1") in the memory area 61c is supplied to the EP-ROM write controller 59 and the EP-ROM read controller 60, thereby starting the EP-ROM write controller 59 so as to reset the count of the code "RTN" in the memory 61a at "0" in accordance with the control instruction from the system controller 55. This resetting operation of the code "RTN" is performed by address updating in step B7 wherein an address is incremented from that for the memory area with data to that for a memory area without data. In this state, the operator enters the codes "PAN", "CHN", "PRK" and "EPD" at the keyboard 24. The key input data is written by the EP-ROM write controller 59 in the memory area 61a in the EP-ROM 61 in step B14. In step B15, the codes "PAN", "CA", "CHN" and "EPD" are read out from the memory area 61a and are suplied to the IC card issuing machine 22. These codes are encrypted and are supplied to the host computer through the signal line. The encrypted codes are thus registered in the data base. As shown in step B16, the code "IPIN" is read out by the EP-ROM read controller 60 from the memory area 61a and is supplied to the IC card issuing machine 22. The code "IPIN" is printed on the paper sheet 27. Thereafter, the flag "Select 2" in the memory area 61c in the EP-ROM 61 is set at logic "0" in step B17, and the access of the code "PMK" in the memory area 61b is inhibited. The issuing operation of the IC card 11 at the issuer 2 is completed. The issuer 2 separately seals the IC card 11 having the predetermined data and the paper sheet 27 printed with the code "IPIN". The IC card 11 and the paper sheet 27 with the code "IPIN" are separately sent to the card holder 3.

Figure 7:
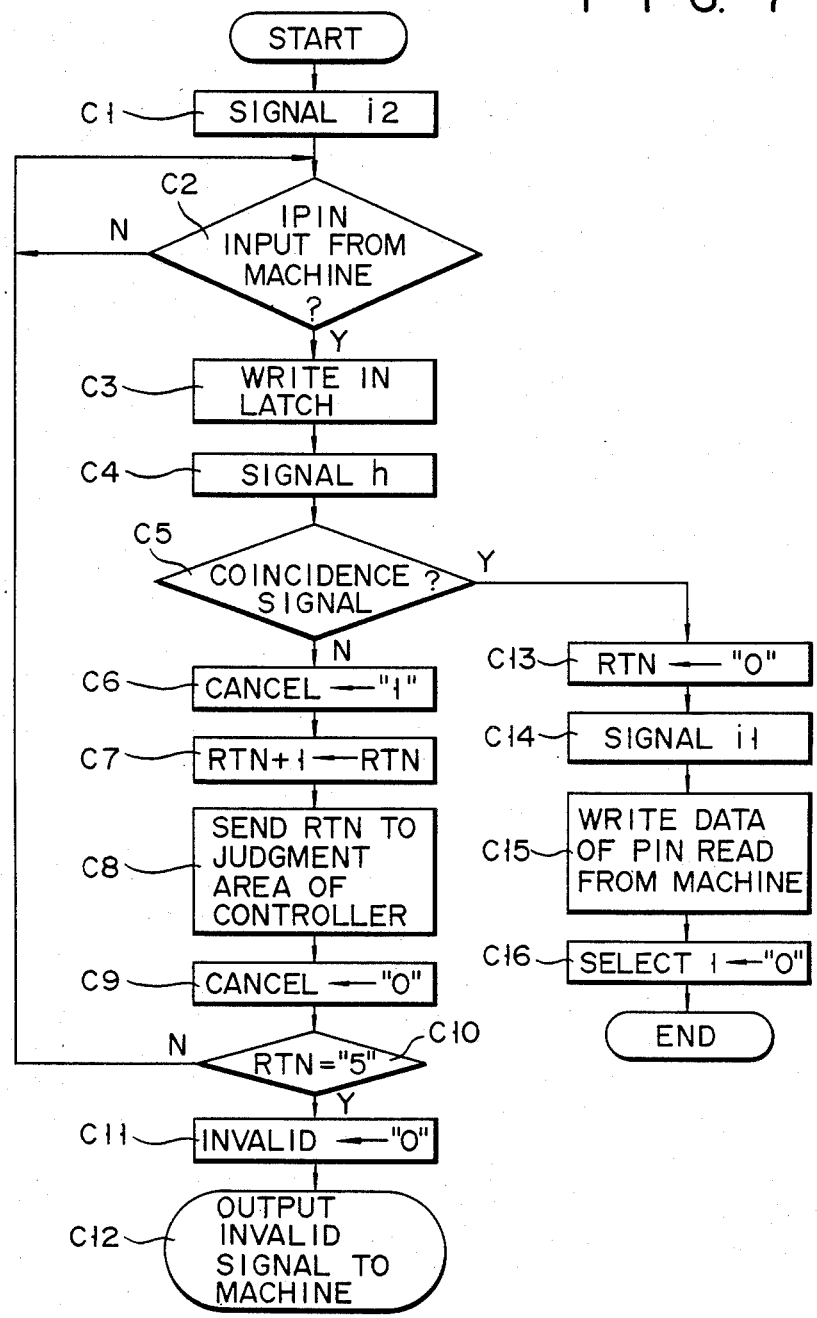
FIG. 7 is a flow chart for explaining an operation performed in the IC card before the holder himself issues the IC card sent from the issuer.

When the card holder 3 receives the IC card 11 and the paper sheet 27 with the code "IPIN", he goes to the issuer 2. The card holder 3 then writes the code "PIN" in this own IC card 11 by using the IC card issuing machine 32 installed on the issuer's premises. The card holder 3 inserts the IC card 11 from the card insertion port 33 in the IC card issuing machine 32, and enters the code "IPIN" printed on the paper sheet 27 at the keyboard 34. The IC card 11 loaded in the IC card issuing machine 32 performs the operation in accordance with the flow chart shown in FIG. 7. The IC card 11 having the arrangement described in detail with reference to FIG. 3 causes the system controller 55 to supply the control signal i2 to the EP-ROM write controller 59 so as to select the data bus DB2 in step C1. In step C2, the system controller 55 then checks whether or not the data is entered at the keyboard 34. The system controller 55 checks the presence/absence of key input data in accordance with the presence/absence of the data reception signal from the interface 51. If YES in step C2, the system controller 55 supplies a latch instruction to the data latch 57. In step C3, the input data from the keyboard 34 is latched by the data latch 57. When the key input data is latched by the data latch 57, the system controller 55 supplies the control signal h to the comparator 64 in step C4. The comparator 64 compares the data latched by the data latch 57 with the code "IPIN" stored in the memory area 61b in the EP-ROM 61. More particularly, since the flag "Select 1" in the memory area 61c in the EP-ROM 61 is initially set at logic "1", the first selector 62 selects the code "IPIN" stored in the memory area 61b. The code "IPIN" is then supplied to the second selector 63. Although the second selector 63 selects the input data in response to the logic state of the flag "Select 2" in the memory area 61c, the flag "Select 2" is set by the issuer 2 at logic "0", so that the second selector 63 selects the code "IPIN" from the memory area 61b, and the code "IPIN" is supplied to the comparator 64. When the comparator 64 receives the operation instruction h from the system controller 55, the comparator 64 compares the code "IPIN" selected by the first and second selectors 62 and 63 with the key input data latched by the data latch 57. A comparison result from the comparator 64 is supplied to the system controller 55. When a coincidence signal is not generated from the comparator 64, the system controller 55 writes data of logic "1" in the cancel latch 58 in step C6, thereby generating the cancel signal Can. As a result, an output from the OR gate 65 is set at logic "1", and this signal of logic "1" is supplied to the AND gate 66. In this case, the flag "Invalid" in the memory area 61c is set at logic "1", so that the output from the AND gate 66 goes to logic "1", and an enable signal is supplied to the EP-ROM write controller 59 and the EP-ROM read controller 60. Subsequently, the system controller 55 supplies the control instruction to the EP-ROM write controller 59, and the count of the code "RTN" stored in the memory area 61a in the EP-ROM 61 is incremented by one in step C7. The system controller 55 causes the EP-ROM read controller 60 to transfer the code "RTN" from the memory area 61a to the judgment area 55a in step C8. Thereafter, in step C9, the content of the cancel latch 58 is reset. In step C10, the system controller 55 checks whether or not the count of the code "RTN" has reached 5. If NO in step C10, the flow returns to step C2, and the same operation as described above is repeated. If the above operation is repeated, and the coincidence signal is not generated from the comparator 64 but the count of the code "RTN" has reached 5, the judgment result in step C10 becomes YES, and the flow advances to step C11. In step C11, the flag "Invalid" in the memory area 61c is reset at logic "0". In step C12, the invalid signal is supplied to the IC card issuing machine 32 so as to signal to the card holder 3 that the IC card 11 has become invalid. The above operation is performed to confirm that the card holder 3 knows the proper code "IPIN", i.e., to check the validity of the card holder 3.

When the card holder 3 enters the proper code "IPIN", the comparator 64 generates the coincidence signal so that the judgment result in step C5 becomes YES. In step C13, the count of the code "RTN" stored in the memory area 61a in the EP-ROM 61 is reset at zero. In step C14, the system controller 55 supplies the control signal i1 to the EP-ROM write controller 59 to select the data bus DB1. On the other hand, the card holder 3 enters any PIN code at the keyboard 34 after the code "IPIN" is entered. The input code "PIN" is written by the EP-ROM write controller 59 in the memory area 61b in the EP-ROM 61. Thereafter, the system controller 55 causes the EP-ROM write controller 59 to set the flag "Select 1" (in the memory area 61c in the EP-ROM 61) at logic "1". The issuing operation of the IC card 11 is completed, and the IC card 11 thus can be used.

Figure 8:
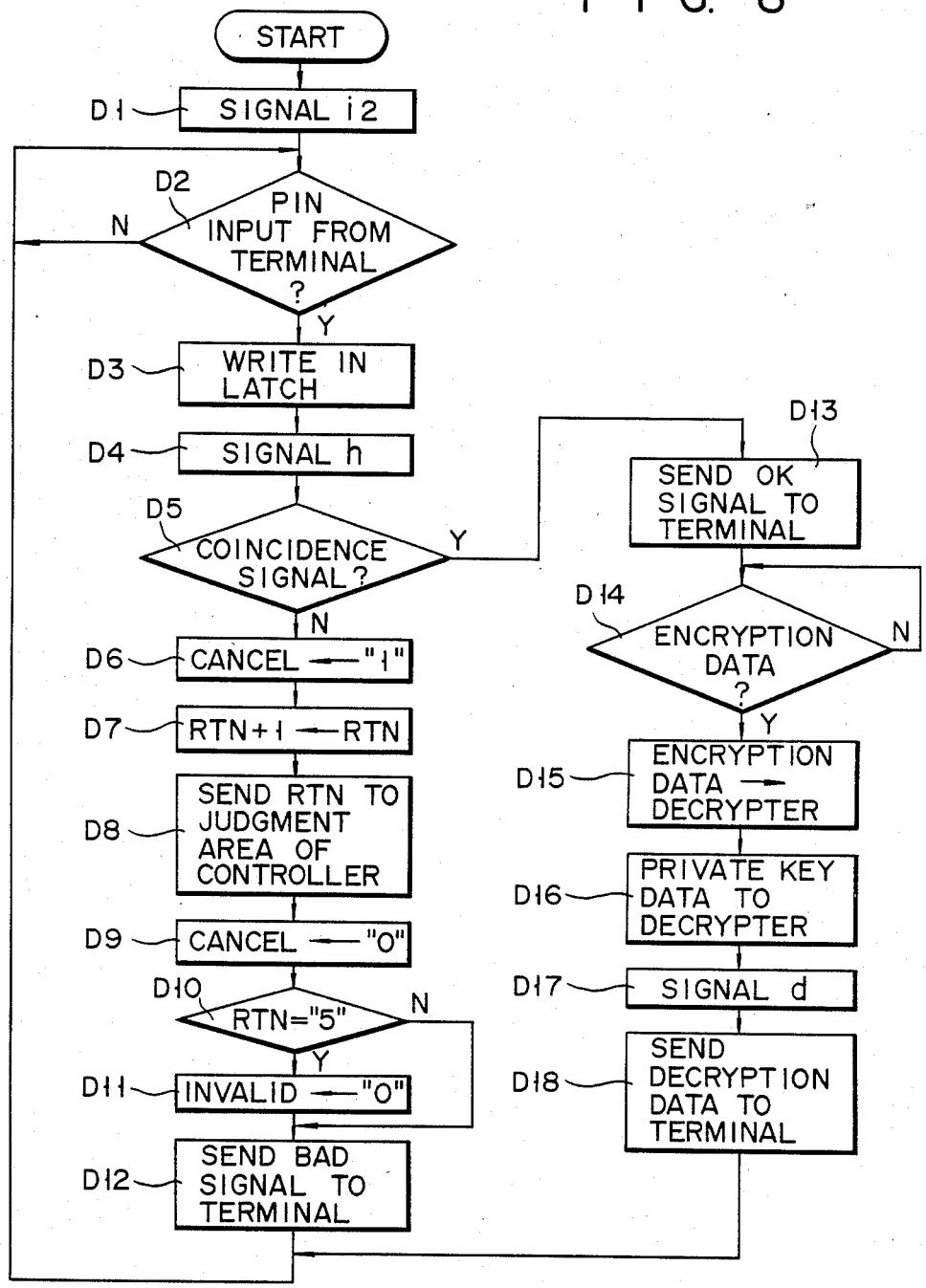
FIG. 8 is a flow chart for explaining an identification operation in the IC card when the IC card is used.

The identification operation at the POS terminal 41 will be described when the card holder 3 uses the IC card 11. When the card holder 3 uses the IC card 11, he inserts the IC card 11 from the card insertion port 42 in the POS terminal 41 of FIG. 2 and enters the code "PIN" registered in the IC card 11 at the keyboard 43. When the IC card 11 is loaded in the IC card issuing machine 32, the operation will be performed in accordance with the flow chart of FIG. 8. The IC card 11 having the arrangement described in detail with reference to FIG. 3 causes the system controller 55 to supply the control signal i2 to the EP-ROM write controller 59 so as to select the data bus DB2, in step D1. The system controller 55 then checks in step D2 whether or not data is entered from the keyboard 34. The system controller 55 checks the presence/absence of the data entered at the keyboard 34 in accordance with the presence/absence of a data reception signal from the interface 51. If YES in step D2, the system controller 55 supplies a latch instruction to the data latch 57, and the input data from the keyboard 34 is latched by the data latch 57 in step D3. When the key input data is latched by the data latch 57, the system controller 55 supplies the control signal h to the comparator 64 in step D3. When the key input data is latched by the data latch 57, the system controller 55 supplies the control signal h to the comparator 64 in step D4. In step D5, the comparator 64 compares the data latched by the data latch 57 with the code "PIN" stored in the memory area 61b in the EP-ROM 61. Since both the flags "Select 1" and "Select 2" in the memory area 61c in the EP-ROM 61 are set at logic "0", the code "PIN" stored in the memory area 61b is selected and supplied to the comparator 64. When the comparator 64 receives the control signal h from the system controller 55, the comparator 64 compares the code "PIN" selected by the first and second selectors 62 and 63 with the key input data latched by the data latch 57. A comparison result is supplied to the system controller 55. When a coincidence signal is not generated from the comparator 64, the system controller 55 writes data of logic "1" in the cancel latch 58 in step D6 so as to generate the cancel signal Can. As a result, an output from the OR gate 65 is set at logic "1", and is supplied to the AND gate 66. When the IC card 11 is normal, the flag "Invalid" in the memory area 61c is set at logic "1", so that an output from the AND gate 66 becomes logic "1" to supply an enable signal to the EP-ROM write controller 59 and the EP-ROM read controller 60. The system controller 55 supplies the control signal to the EP-ROM write controller 59. In step D7, the count of the code "RTN" stored in the memory area 61a in the EP-ROM 61 is incremented by one. Subsequently, the system controller 55 causes the EP-ROM read controller 60 to transfer the code "RTN" from the memory area 61a to the judgment area 55a. Thereafter, in step D9, the content of the cancel latch 58 is reset. Subsequently, the system controller 55 checks in step D10 whether or not the count of the code "RTN" has reached 5. If NO in step D10, the flow advances to step D12, wherein the system controller 55 supplies a Bad signal to the POS terminal 41. The display panel 44 then displays that the input "PIN" code is wrong. Even if the above operation is repeated and the coincidence signal is not generated from the comparator 64 but the count of the code "RTN" has reached 5, the judgment result in step D10 becomes YES. The system controller 55 then supplies the invalid signal to the POS terminal 41, and the flow returns to step D2. When the POS terminal 41 receives the Bad signal from the IC card 11 in step D12, the POS terminal 41 signals to the card holder 3 that the IC card 11 has become invalid to be described in detail later. The above operation is made to confirm that the card holder 3 knows the right code "IPIN", i.e., to check the validity of the card holder 3.

When the card holder 3 enters the right code "PIN", the judgment result in step D5 becomes YES. The system controller 55 supplies an OK signal to the POS terminal 41 in step D13. In step D13, the system controller 55 waits for the encrypted data from the POS terminal 41. When the POS terminal 41 receives the OK signal from the IC card 11, the POS terminal 41 decrypts the test message to be described in detail later. The encrypted data is supplied to the IC card 11. When the IC card 11 receives the encrypted data from the POS terminal 41, the flow advances from step D14 to step D15, and the encrypted data is supplied to the ALU 56. The system controller 55 causes the EP-ROM read controller 60 to read out the code "PRK" from the memory area 61a in the EP-ROM 61, and the readout code and the operation instruction d are supplied to the ALU 56. The ALU 56 is started to decrypt the encrypted data from the POS terminal 41 in accordance with the code "PRK". The decrypted result is supplied to the POS terminal 41 in step D18. The operation at the side of the IC card 11 is completed.

Figure 9:
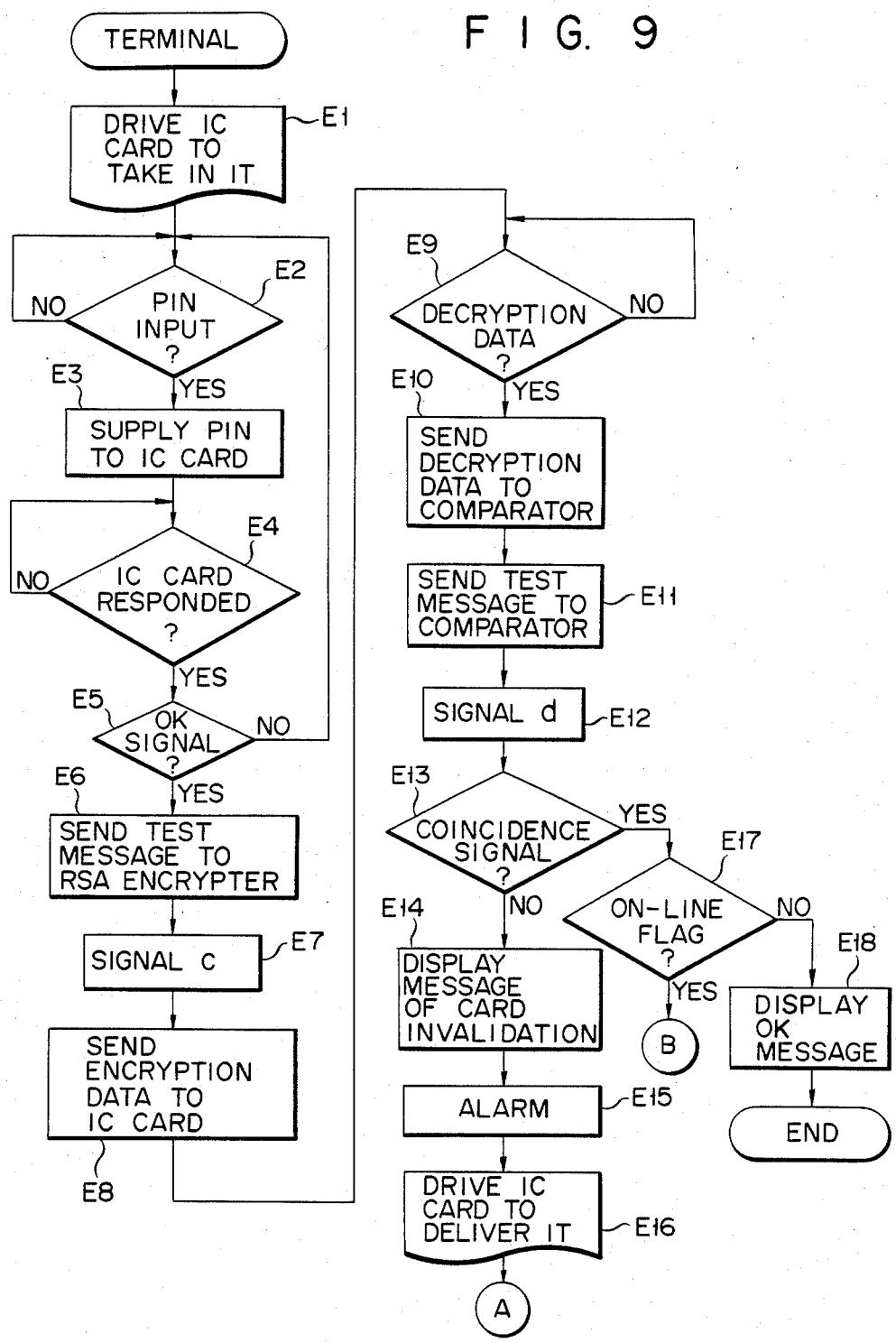
FIG. 9 is a flow chart for explaining an identification operation of the IC card at the POS terminal.

The POS terminal 41 having the arrangement described in detail with reference to FIG. 4 performs the operation in accordance with the flow chart in FIG. 9 when the IC card 11 is inserted in the card insertion port 42. When the IC card 11 is inserted in the card insertion port 42, the POS terminal 41 detects the IC card 11, and the main controller 76 supplies an operation instruction to the card reader driver/controller 79. In step E1, the IC card 11 is conveyed by the card reader mechanism 88 to a predetermined position. The main controller 76 waits until the code "PIN" is entered at step E2. When the code "PIN" is entered, the code is supplied to the IC card 11 through the IC card interface 80 in step E3. Thereafter, in step E4, the main controller 76 waits until a response signal is received in step D12 or step D13 in FIG. 8. When the response signal from the IC card 11 is supplied to the main controller 76, the controller 76 checks in step E5 whether or not the response signal is the OK signal. If NO in step E5, the flow returns to step E2, and the above operation is repeated. When the OK signal is supplied from the IC card 11 to the main controller 76, the main controller 76 reads out the test message from the data ROM 75 in step E6. The test message is supplied to the "RSA" encrypter 82. At the same time PAN is read from the IC card 11 and is determined the public key code corresponding to IC card 11 from the public key code memory 89 by the issuer code included in the PAN thus read out. In step E7, the main controller 76 supplies an operation instruction c to the "RSA" encrypter 82. The "RSA" encrypter 82 is started to encrypt the test message in accordance with the determined public key code from the public key code memory 89. The encrypted data is supplied to the IC card 11 in step E8. The IC card 11 detects the encrypted data in step D14 in FIG. 8, and the encrypted data is decrypted in step D18, and the decrypted data is supplied to the POS terminal 41. The POS terminal 41 keeps waiting in step E9 until the decrypted data is supplied from the IC card 11. When the decrypted data is received by the POS terminal 41, the flow advances to step E10. In step E10, the main controller 76 sends the decrypted data to the comparator 81. Subsequently, in step E11, the main controller 76 reads out the test message from the data ROM 75, and the readout test message is supplied to the comparator 81. The main controller 76 supplies the operation instruction d to the comparator 81 in step E12, so that the comparator 81 is started. The comparator 81 compares the decrypted data from the IC card and the test message stored in the data ROM 75. A comparison result is supplied to the main controller 76. The main controller 76 detects in step E13 whether or not a coincidence signal is generated from the comparator 81. When the comparator 81 does not generate the coincidence signal, the flow advances to step E14. In step E14, the invalid message from the IC card 11 is supplied to the display driver/controller 78 which causes the display panel 44 to display the invalid message. Subsequently, in step E15, the main controller 76 supplies the operation instruction to the sound controller 72 to produce an alarm at the loudspeaker 87. Thereafter, the main controller 76 supplies the operation instruction to the card reader driver/controller 79 in step E16, thereby dispensing the IC card 11 from the card insertion port 42 by means of the card reader mechanism 88. However, when the coincidence signal is generated from the comparator 81, the judgment result in step E13 becomes YES, and the flow advances to step E17. The main controller 76 checks in step E7 whether or not the on-line flag is set. If NO in step E17, the flow advances to step E18. The OK message is displayed on the display panel 44 to complete identification operation for the IC card 11. However, if YES in step E17, an on-line identification shown in the flow chart of FIG. 10 is performed.

Figure 10:
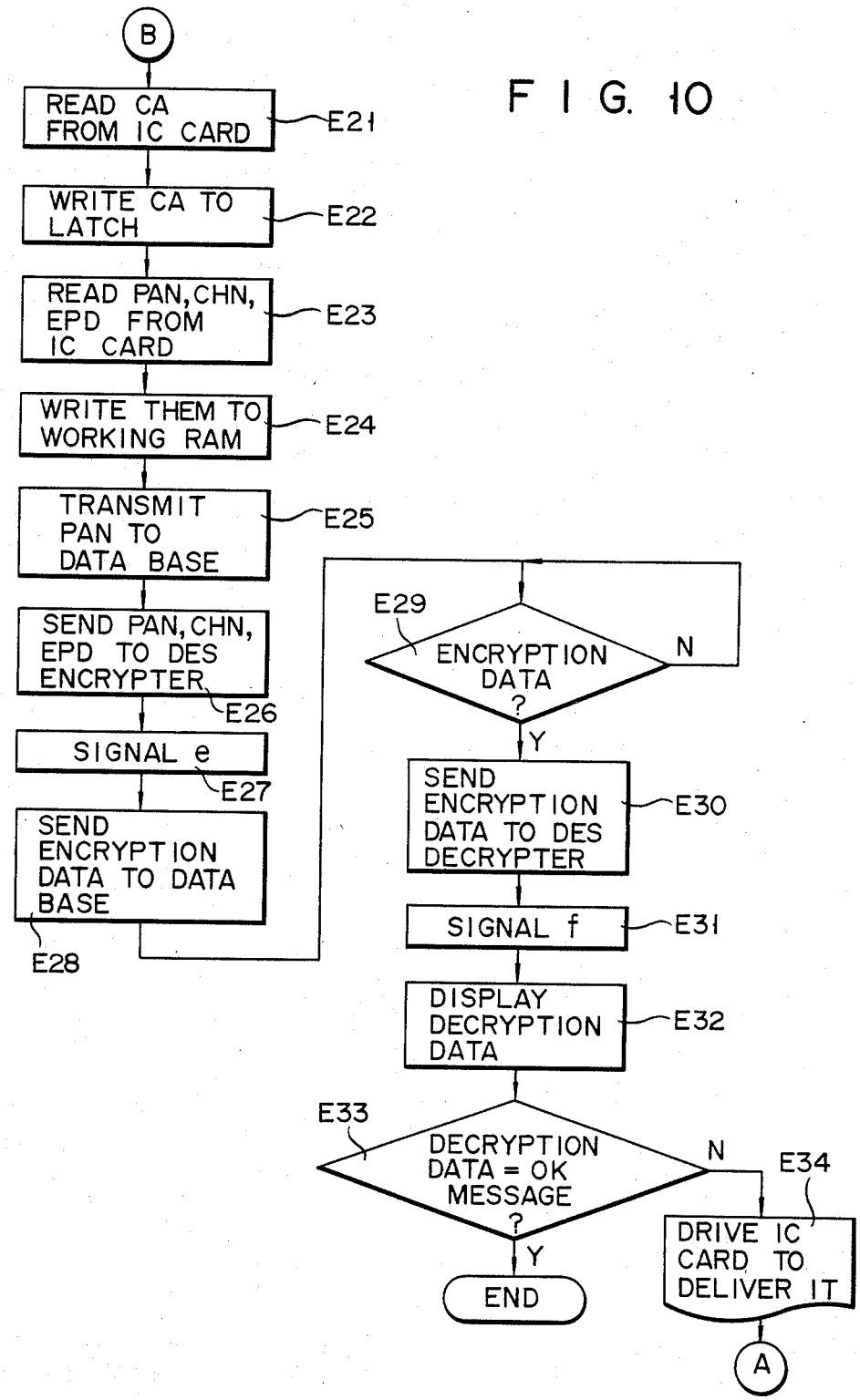
FIG. 10 is a flow chart for explaining an on-line identification operation of the IC card at the POS terminal.

In step E21 in FIG. 10, the code "CA" stored in the memory area 61a in the EP-ROM 61 is supplied from the IC card 11 to the POS terminal 41. The code "CA" is written in the latch 83 in step E22. The codes "PAN", "CHN" and "EPD" stored in the memory area 61a in the EP-ROM 61 of the IC card 11 are read out therefrom in step E23, and are stored in the working RAM 73 in step E24. In step E25, the code "PAN" is read out from the working RAM 73 and is supplied to the host computer through the on-line transmission line under the control of the communication controller 86. The main controller 76 then reads out the codes "PAN", "CHN" and "EPD" from the working RAM 73 in step E26, and these codes are supplied to the "DES" encrypter 84. The "DES" encrypter 84 is started in response to the operation instruction e to encrypt the data from the working RAM 73 in accordance with the code "CA" held by the latch 83. The encrypted data are supplied to the host computer in step E28. When the host computer receives the encrypted data from the POS terminal 41 to be described later, the host computer decrypts the encrypted data. The host computer then sends back the OK message or the invalid message to the POS terminal 41 in accordance with the decrypted result. The POS terminal 41 is kept waiting in step E29 until the encrypted data is send back from the host computer, the encrypted data is supplied from the communication controller 86 to the "DES" decrypter 85 in step E30. Subsequently, the main controller 76 supplies an operation instruction f in step E31 to the "DES" decrypter 85 in step E31. The encrypted data is decrypted by the "DES" decrypter 85 in accordance with the code "CA" stored in the latch 83. The decrypted result is displayed on the display panel 44 in step E32. Thereafter, in step E33, the main controller 76 checks whether or not the decrypted data comprises the OK message. If YES in step E33, the operation is ended. However, if NO in step E33, the IC card 11 is dispensed from the card insertion port 42 in step E34.

Figure 11:
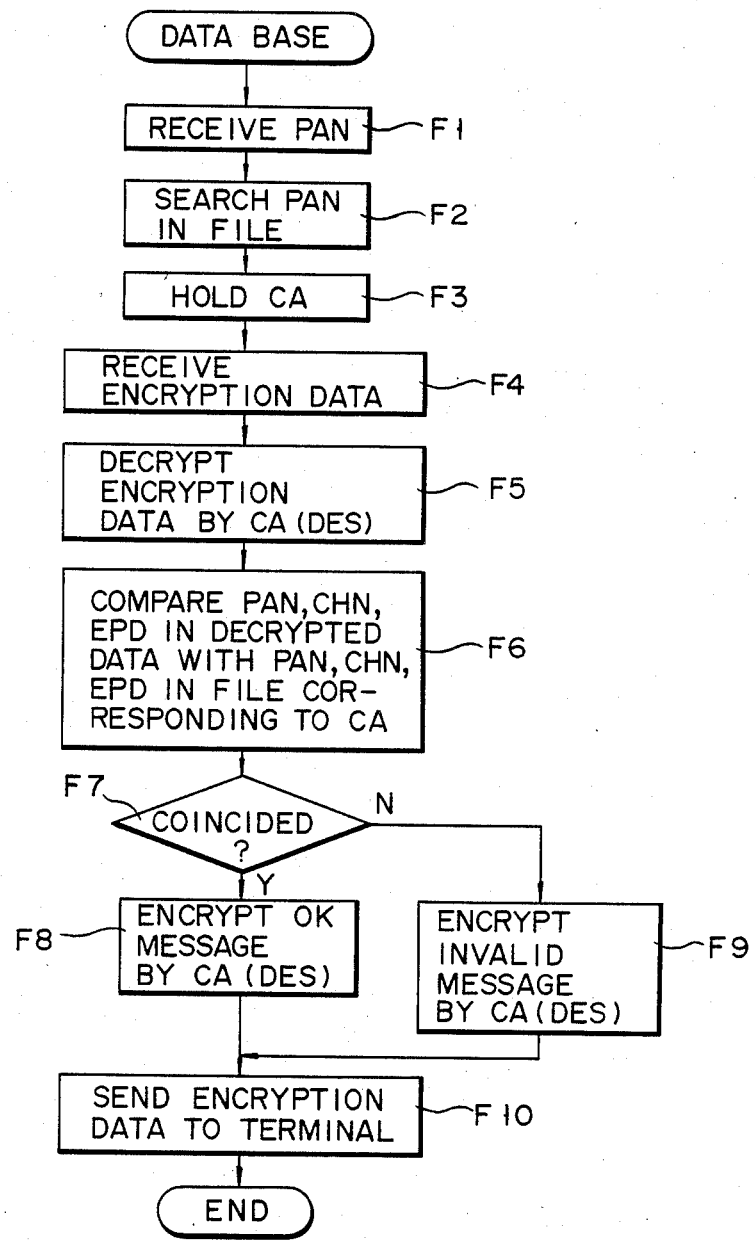
FIG. 11 is a flow chart for explaining an on-line identification operation of an IC card at a host computer.

On the other hand, when data is transmitted from the POS terminal 41 to the host computer, the host computer performs the operation in accordance with the flow chart in FIG. 11. In step F1, the host computer receives the code "PAN" from the POS terminal 41. In step F2, the host computer performs search operation throughout a file. The host computer reads out the code "CA" corresponding to the code "PAN". Thereafter, in step F4, when the host computer receives the encrypted data from the POS terminal 41, the encrypted data is decrypted in accordance with the code "CA". In step F6, the codes "PAN", "CHN" and "EPD" in the decrypted data are compared with the codes "PAN", "CHN" and "EPD" in a file corresponding to the code "CA". The host computer checks in step F7 whether or not their coincidence is established. If YES in step F7, the flow advances to step F8, and the OK message is encrypted by the code "CA". However, if NO in step F7, the flow advances to step F9, and the invalid message is encrypted by the code "CA". When the operation in step F8 or F9 is completed, the encrypted data is supplied from the host computer to the POS terminal 41. The POS terminal 41 decrypts the encrypted data from the host computer. The decrypted content is displayed as a result representing of the validity or invalidation of the IC card 11. In this manner, all identification operations are ended.

Throughout the above description, it is stated that the printed papers with the "PMK" and "IPIN" codes thereon are sent separately to the issuer and card holder, respectively. Preferably, these codes are printed in sealed mailers of the type in which the contents are not known until the sealed mailers are opened. Such mailers are well known in the art. This prevents access to the "PMK" and "IPIN" codes by intermediaries in the issuance procedures, and increases security.

At issuance of the IC card by the issuer, in addition to the "PAN" code, the issuer preferably enters other data such as account name, expiration date, use limitation, etc., or any combination of these data items, as desired.

In the foregoing description, codes such as "PAN", "CA" and "IPIN" are input by manual keyboard operation. Alternatively, this information can be input automatically by a data processing system. The code "CA" can be randomly generated by a random data generator and automatically input into the IC card 11. At the issuer station 2, the code "PAN" can be pre-set in the issuer's data bank, and can be read out from the issuer's data bank, and automatically stored in the IC card 11. This would eliminate the necessity of the operator keying in the "PAN" at the keyboard 24 of the issuing machine 22. Also, at the time of issuance, the code "CA" can be automatically loaded into the issuer's data base after entry of the "PMK" code. In another modification, the "PMK" code can be written into a card, such as an IC card, which can be sent from the manufacturer to the issuer, and the card can be inserted into a card issuing machine, such as machine 22. At that point, the "PMK" code in the card can be automatically set into the machine 22 for comparison with the "PMK" code already stored in the IC card 11. This eliminates the necessity of manual insertion of the "PMK" code at the keyboard 24, and also increases security since an operator will not know the "PMK" code. Issuing a separate card with a "PMK" code stored therein is efficient since the "PMK" code is used for batches of IC cards 11. Since the "IPIN" code generated by the card holder is unique to an individual card, it is not efficient to use a separate card to store the "IPIN" code, and it is more efficient to generate the "IPIN" code on paper, such as in a sealed, secret type mailer.

When the IC card 11 is used in a transaction, such as purchasing items at a merchant store, obtaining cash advances from a bank, etc., the transaction data transmitted to the issuer after the identification process is completed is transmitted in encrypted form by using the "CA" code as the key for the "DES" encryption. At this time, during sending of transaction data to the issuer, the "PAN" code is not encrypted in a preferred arrangement. The "PAN" code is received by the issuer, and the issuer's data bank retrieves the information corresponding to the "PAN" code, such as the "CA" code and any other pertinent information, as desired. After the "CA" code is retrieved from the issuer's data bank, it is used as a key for "DES" decryption of the transaction data. After decryption of the transmitted transaction data, the issuer sends a response message to the terminal issuing the transaction data which could be a positive or negative response, depending upon whether or not the information has been correctively received, whether or not the user's credit line is exceeded, or any other established criteria. The response from the issuer is also preferably encrypted using the "CA" code as the key for "DES" encryption. At the receiving terminal, the response signal is decrypted using the "CA" code from the user's card as the decryption key. Thus, the transaction is completed and the issuer uses the transaction data in the normal manner.

While the invention has been described above in connection with specific implementations, it should be clear that various modifications and alterations can be made within the scope of the appended claims.

What is claimed is:

1. An IC card having an IC circuit, which comprises:
   first memory means for storing at least a plurality of personal data of a card holder;
   second memory means for storing production master key (PMK) data preset at a first stage and used for checking validity of a card holder when an IC card is transferred from the first stage to a second stage, and for storing initialization personal identificaton number (IPIN) data used for checking validity of a card holder when an IC card is transferred from the second stage to a third stage;
   third memory means for storing at least personal identification (PIN) data set by a card holder at the third stage for checking validity of the card holder when a future transaction is performed by the card holder by using the IC card;
   interface means for controlling data which is output from the IC card and data which is input to the IC card to be compared with the data stored in at least said second and third memory means;
   comparing means for comparing a PMK data input to the IC card via said interface means for checking validity of the card holder at the second stage when the IC card is transferred from the first stage to the second stage with the PMK data stored in said second memory means, and for comparing an IPIN data input to the IC card via the interface means for checking validity of a card holder when the IC card is transferred from the second stage to the card holder at the third stage with the IPIN data stored in said second memory means; and
   means for permitting reading and/or writing at least one of said first to third memory means in accordance with a coincidence signal obtained from said comparing means.

2. An IC card according to claim 1, wherein said IC circuit includes designating means for designating as data compared with the external data any one of data stored in said second and third memory means.

3. An IC card according to claim 2, wherein said designating means designates the PMK data in said second memory means in an initial state, and said IC circuit includes means for allowing primary account number (PAN) data representing card issuance at the second stage to be written into said first memory means when said comparing means detects a coincidence between the external data and the PMK data stored in said second memory means, and means for changing designation by said designating means to designation of the IPIN data.

4. An IC card according to claim 3, wherein said IC circuit includes means for allowing any PIN data selected by the card holder to be written into said third memory means when said comparing means detects a coincidence between the external data and the IPIN data stored in said second memory, and means for changing designation by said designating means to designation of the PIN data.

5. An IC card according to claim 1, wherein said first memory means stores different types of card authentication (CA) data in units of IC cards.

6. An IC card according to claim 1, wherein said IC circuit includes counting means for counting the number of succeeding noncoincidence signals from said comparing means, and means for inhibiting data read/write operation of said first, second and third memory means and invalidating a corresponding IC card when a count of said counting means has reached a predetermined number.

7. An IC card according to claim 1, wherein said IC circuit includes means for decrypting externally supplied encrypted data.

8. An IC card according to claim 7, wherein said first memory means stores private key (PRK) data representing a key for decryption.

9. An IC card according to claim 1, wherein at least one of said first, second and third memory means comprises an EP-ROM (Erasable Programmable Read Only Memory).

10. An IC card identification system comprising:
an IC card incorporating an IC circuit including a memory for storing a plurality of secret data, the plurality of secret data including at least production master key (PMK) data preset at a first stage and initialization personal identification number (IPIN) data;
printout means for confidentially printing out the PMK data at the first stage on a first sealed sheet, said IC card and the first sealed sheet being delivered to a card holder at a second stage;
means for identifying the PMK data obtained by entering the PMK data printed on said first sealed sheet with the PMK data stored in said memory of said IC card;
means for storing primary account number (PAN) data in said IC card upon detection of a coincidence between the entered PMK data and the PMK data stored in said memory and for printing out the IPIN data read out from said memory on a second sealed sheet, said IC card and the second sealed sheet being delivered to a card holder at a third stage;
means for identifying IPIN data entered by the IPIN data printed on said second sealed sheet with the IPIN data stored in said memory of said IC card; and
means for storing personal identification number (PIN) data which is arbitrarily selected by the card holder in the IC circuit upon detection of a coincidence between the entered IPIN data and the IPIN data stored in said memory.

11. A system according to claim 10, further including means for invalidating issuance of said IC card when the coincidence between the entered PMK data and the PMK data stored in said memory or between the entered IPIN data and the IPIN data stored in said memory is not established.

12. A system according to claim 10, wherein at least one of the PMK data and the IPIN data which are stored in said memory is generated by using outputs from a random number generator.

13. A system according to claim 10, further including a terminal which is installed at a point of sales (POS) and which includes means for inputting said PIN data by a card holder to identify said IC card presented by the card holder.

14. A system according to claim 13, wherein said IC card includes means for reading PIN data input by the card holder through said terminal, said IC card including comparing means for comparing read PIN data with the pin data stored therein.

15. A system according to claim 14, wherein said IC card includes means for transferring identification result data obtained by comparison in said IC card to said terminal, and said terminal includes means for producing an alarm in accordance with the identification result data transferred thereto.

16. A system according to claim 14, wherein said PIN data comparing means includes retry executing means for retrying comparison operations a predetermined number of times.

17. An IC card identification system comprising:
an IC card incorporating an IC circuit including a memory for storing card authentication (CA) data preset by a manufacturer and given such that different CA data are assigned in units of IC cards;
a host computer for reading out the different CA data from the respective IC cards and storing all the CA data in a data base; and
a terminal, connected to said host computer through a data transmission means, for identifying a presented IC card,
said terminal having readout means for reading out the CA data from the presented IC card, means for encrypting predetermined transaction message data in accordance with the CA data from the presented IC card, and means for transmitting encrypted predetermined transaction message data to said host computer, and said host computer having means for decrypting the encrypted transaction message data by using the CA data stored in the data base, means for discriminating whether or not the decrypted transaction message data is the predetermined transaction message data in said terminal, and means for transmitting a discriminated result to said terminal.

18. A system according to claim 17, wherein said terminal includes means for transmitting designation data for designating the CA data stored in the data base in said host computer prior to transmission of the encrypted transaction message data, and said host computer includes means for designating the CA data in the data base in accordance with the designation data.

19. A system according to claim 17, wherein said memory of said IC card and the data base of said host computer store pairs of different CA data and corresponding primary account number (PAN) data.

20. A system according to claim 19, wherein the predetermined transaction message data comprises PAN data stored in the IC card, and said host computer includes means for reading out the PAN data which is compared with the CA data used for decryption of the predetermined transmission message data and means for discriminating a coincidence between the PAN data and the decrypted transaction message data.

21. A system according to claim 17, wherein encryption and decryption by the CA data is based on a DES (Data Encryption Standard).

22. A system according to claim 17, wherein said terminal includes means for discriminating the discrimination result sent from said host computer, and means for producing an alarm in accordance with a discrimination by said discriminating means.

23. A system according to claim 17, wherein said transmitting means in said host computer includes means for sending data obtained by encrypting the CA data in accordance with discrimination result data.

24. A system according to claim 23, wherein the encryption by the CA data is based on a DES (Data Encryption Standard).

25. A system according to claim 24, wherein said terminal includes means for decrypting the encrypted data from said terminal by using the CA data read out from said IC card.

26. A system according to claim 23, wherein said terminal includes means for discriminating the predetermined result sent from said host computer, and means for producing an alarm indication in accordance with a discrimination by said discriminating means.

27. An IC card identification system comprising:
an IC card incorporating an IC circuit including a memory for storing first key data; and
a terminal for storing second key data and for identifying an IC card presented by a card holder, the second key data being different from the first key data but having a correlation with the first key data in a one-to-one correspondence in accordance with a predetermined function,
said terminal having means for encrypting predetermined test message data in accordance with the second key data and means for transmitting encrypted test message data to said IC card,
said IC card having means for receiving the encrypted test message data and decrypting the message data by the first key data stored therein and means for transmitting decrypted test message data to said terminal, and
said terminal further including means for comparing the decrypted test message data from said IC card with a predetermined self test message, and means for producing an alarm of a comparison result.

28. A system according to claim 27, wherein the first key data comprises different key data in units of issuers issuing corresponding IC cards, the first key data being identical for each issuer.

29. A system according to claim 28, wherein said terminal has means for storing second key data corresponding to the different PRK data in units of issuers, and means for designating only one second key data corresponding to an IC card presented by the card holder.

30. A system according to claim 27, wherein the predetermined function comprises one-way functions which depend on an encryption scheme based on an RSA-algorithm.

31. An IC card according to claim 1, wherein said first stage occurs at a manufacturer of said card, said second stage occurs at an issuer of said card, and said third stage occurs by the card holder to whom the card has been issued.

32. An IC card according to claim 1, wherein said comparing means compares PIN data which is input to the IC card via the interface means for checking the card holder with the PIN data stored in said third memory means.

33. A method for producing an IC card having a memory means therein which is accessible by a card holder for reading and/or writing operations on said IC card, comprising the steps of:
storing at least a plurality of personal data of a card holder;
storing production master key (PMK) data preset at a first stage and used for checking validity of a card holder when an IC card is transferred from the first stage to a second stage;
storing initialization personal identification number (IPIN) data used for checking validity of a card holder when an IC card is transferred from the second stage to a third stage;
storing at least a personal identification number (PIN) data set by a card holder at the third stage for checking validity of the card holder when a future transaction is performed by the card holder by using the IC card;
controlling data output from the IC card and data input to the IC card for comparison with data stored in said memory means;
comparing a PMK data input to the IC card for checking the validity of the card holder at the second stage when the IC card is transferred from the first stage to the second stage with the PMK data stored in said memory means;
comparing IPIN data input to the IC card for checking validity of a card holder when the IC card is transferred from the second stage to the card holder at the third stage with the IPIN data stored in said memory means; and
permitting reading from and/or writing into said memory means in accordance with a coincidence signal obtained from said comparison step.

34. A method for providing an IC card identification comprising the steps of:
storing in a memory carried on said IC card a plurality of secret data, the plurality of secret data including at least production master key (PMK) preset at a first stage and initialization personal identification number (IPIN) data;
printing out the PMK data in the memory on a first sealed sheet at the first stage;
delivering the IC card and the first sealed sheet to a card holder at a second stage;
identifying the PMK data obtained by entering the PMK data printed on the first sealed sheet with the PMK data stored in the memory of said IC card;
storing primary account number (PAN) data in the memory upon detection of a coincidence between the entered PMK data and the PMK data stored in said memory and for printing out the IPIN data read out from said memory onto a second sealed sheet;
delivering the IC card and said second sealed sheet to a card holder at a third stage;
identifying IPIN data entered by the IPIN data printed on said second sealed sheet with the IPIN data stored in said memory of said IC card; and
storing personal identification number (PIN) data which is arbitrarily selected by the card holder in the memory upon detection of a coincidence between the entered IPIN data and the IPIN data stored in said memory.

35. A method for providing an IC card identification, comprising the steps of:
incorporating an IC circuit including a memory into an IC card for storing card authentication (CA) data preset by a manufacturer and given such that different CA data are assigned in units of IC cards;
reading out the different CA data from the respective IC cards and storing all the CA data in a data base in a host computer;
reading out the CA data from the presented IC card with a terminal having readout means;
encrypting a predetermined transaction message data in accordance with the CA data from the presented IC card;
transmitting encrypted predetermined transaction message data to said host computer;
decrypting with said host computer the encrypted transaction message data by using the CA data stored in the data base;
discriminating whether or not the decrypted transaction message data is the predetermined transaction message date in said terminal; and
transmitting a discriminated result to the terminal.

36. A method for providing an IC card identification, comrpising the steps of:
incorporating into an IC card an IC circuit including a memory for storing first key data;
storing the second key data in a terminal;
identifying an IC card presented by a card holder to said terminal;
setting the second key data to be different from the first key data but having a correlation with the first key data in a one-to-one correspondence in accordance with a predetermined function;
encrypting predetermined test message data in accordance with the second key data and transmitting encrypted test message data to the IC card;
receiving the encrypted test message and decrypting the message data by the first key data stored therein, and transmitting decrypted test message data to said terminal; and
comparing the decrypted test message data from said IC card with a predetermined self test message; and producing an alarm of a comparison result.

37. An IC card according to claim 31, wherein the IPIN data is preset together with the PMK at the first stage in said second memory means.

38. An IC card identification system according to claim 10, wherein the IPIN data is preset in the memory of the IC card.

39. An IC card identification system according to claim 10, wherein said first stage is manufacturing of the IC card by a manufacturer, said second stage is issuing of the IC card by an issuer, and said third stage is possessing of the IC card by the customer.

40. A system according to claim 27, wherein said first key data is an issuer's private key (PRK) data, and said second key data is an issuer's public key data.

41. A system according to claim 27, wherein said terminal further includes means for preventing the first key data from being read out of said terminal.

42. A method for identifying an IC card, comprising the steps of:
(a) storing production master key (PMK) data in a memory means of the IC card at a first stage to check the validity of a card holder, and then delivering the IC card to a second stage;
(b) comparing, in said IC card at the second stage, the PMK data stored in said memory means with PMK data input to said IC card, and delivering the IC card to a third stage when the compared PMK data stored in the card and input to the card are identical; and
(c) comparing, in said IC card at a third stage, initialization personal identification number (IPIN) data stored in the IC card with IPIN data which is input to said IC card, and storing personal identification (PIN) data in the memory means of the IC card when the compared IPIN data stored in the card and input to it are identical.

43. A method according to claim 42, wherein the step (a) further includes:
confidentially printing the PMK data stored in said memory means on a first sealed sheet, and
delivering the IC card and the first sealed sheet to the second stage.

44. A method according to claim 43, wherein step (b) further includes:
confidentially printing the IPIN data stored in said memory means on a second sealed sheet, and
delivering the IC card and the second sealed sheet to the third stage.

45. A method according to claim 42, wherein in step (a) the IPIN data is stored together with PMK data in said memory means.

46. An IC card system comprising:
an IC card; and
a terminal provided at a manufacturer for communicating with the IC card, said terminal including means for generating a signal to start a test on an internal circuit of the IC card,
said IC card including testing means having a testing program for testing the internal circuit of the IC card and being responsive to the signal from said terminal for starting the test.

47. An IC card system according to claim 46, wherein said IC card includes an initializing means for initializing said internal circuit, and the internal circuit of the initialized IC card is tested by said testing means when said signal is supplied from said terminal to said IC card.

48. A system according to claim 47, wherein said terminal comprises control means for confirming that said testing means detects no abnormal test results with respect to an internal circuit, and identification data for checking the validity of an issuer is input through said terminal and is then stored in said IC card when said testing means detects no abnormal conditions of the internal circuit of said IC card.

49. A system according to claim 48, wherein said identification data is PMK data.

50. A system according to claim 48, wherein said terminal further includes means for printing the PMK data.

51. An IC card system comprising:
an IC card having an IC circuit; and
a terminal for transmitting data to said IC card and/or a host compoter and receiving data from said IC card and/or the host computer;
said terminal including memory means for storing a flag representing whether said terminal is set in a first mode or a second mode, whereby the terminal communicates with the host computer when said flag is set in the first mode, and is inhibited from communicating with the host computer when said flag is set in the second mode;

said IC card further including means for checking authenticity of at least one of said IC card and said terminal, and wherein after at least one of said IC card and terminal is found to be authentic, the data stored in said memory means is checked to confirm whether data should be transmitted between said IC card and said terminal in the first mode or the second mode.

* * * * *